UNITED STATES PATENT OFFICE.

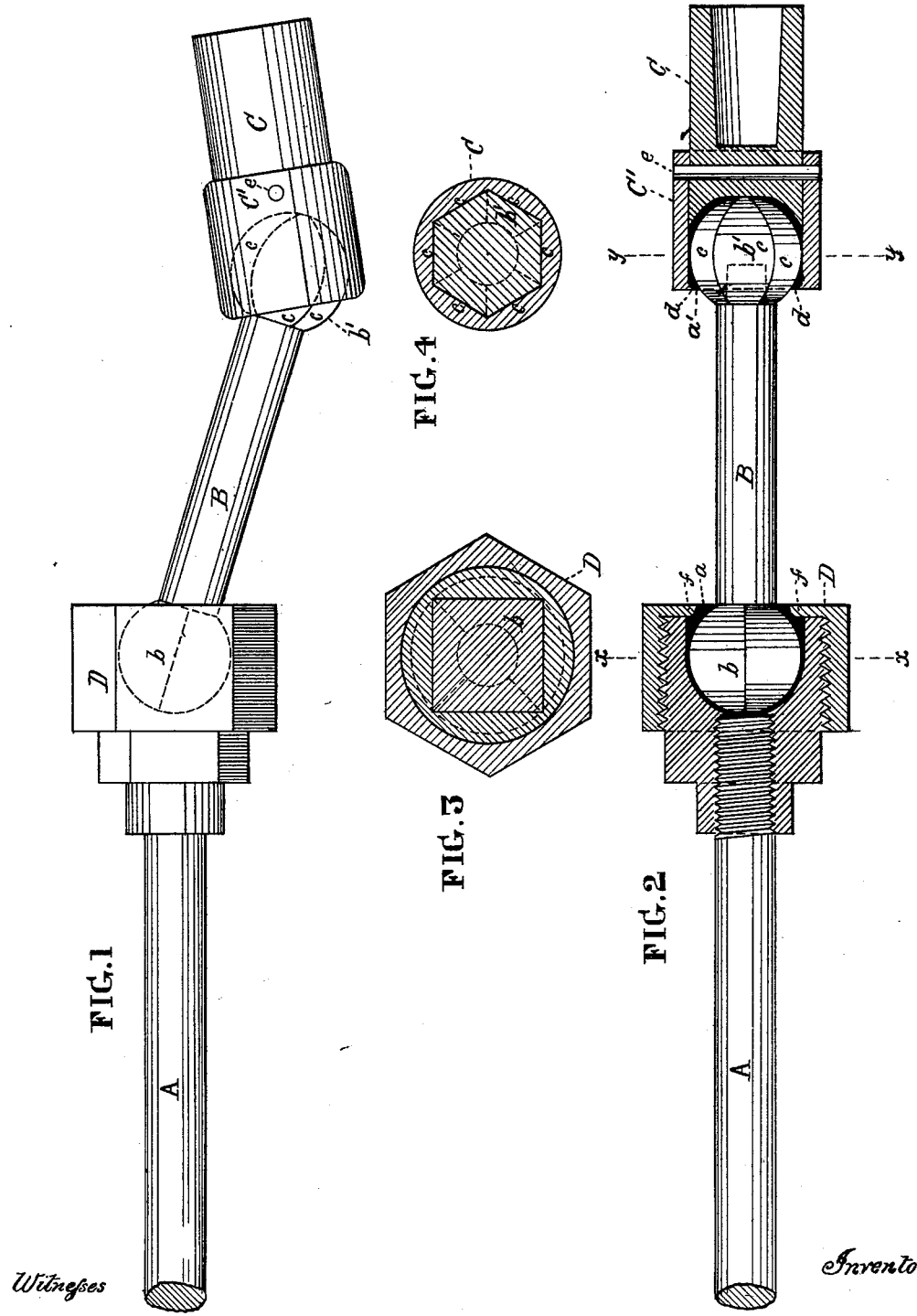

HIRAM A. KIMBALL, OF PHILADELPHIA, PA., ASSIGNOR OF ONE-THIRD HIS RIGHT TO ARTHUR MILLER, OF MOORESTOWN, N. J.

IMPROVEMENT IN FLEXIBLE SHAFT-COUPLINGS.

Specification forming part of Letters Patent No. 218,278, dated August 5, 1879; application filed March 14, 1879.

*To all whom it may concern:*

Be it known that I, HIRAM A. KIMBALL, of the city and county of Philadelphia, in the State of Pennsylvania, have invented a new and useful Improvement in Flexible Couplings for Shafts or Tubes, of which the following is a specification.

My invention consists of a ball-and-socket joint, in which the ball has four or more equal sides of circular form in the longitudinal direction of the shaft or tube with which it is connected, but flat at right angles therewith, or in the circumferential direction of the shaft. The socket has corresponding sides, so as to be held firmly circumferentially with the ball, while the latter is permitted to turn longitudinally, to provide for the shafts or tubes being brought out of line in any direction, as hereinafter described.

In the accompanying drawings, which make a part of this specification, Figure 1 is a side view of the shafts A B and coupling C, arranged out of line with each other to illustrate the character of the coupling. Fig. 2 is a side view of the shafts A B and coupling C, having balls $b$ and sockets $a$, the latter being in section. Fig. 3 is a cross-section at the line $x\ x$ of Fig. 2. Fig. 4 is a like section at the line $y\ y$ of Fig. 2.

Like letters of reference in all the figures indicate the same parts.

A is a shaft, which has a socket, $a$, at one end; and B is a similar shaft, having a ball, $b$, at one end, and a ball, $b'$, at its other end. The ball $b$ has four equal sides, C, which are flat in the circumferential direction of the shaft; and the socket $a$ is of like form in that direction, to provide for the two shafts A B being held together firmly circumferentially; but to provide for the two shafts being arranged out of line in any direction, the sides of the ball are concentric with its center in the longitudinal direction of the shaft, and the sides of the socket $a$ are curved to correspond therewith, so as to admit of the ball and socket working freely in that direction.

C is a coupling for a shaft, drill, or other device. It is connected with the shaft B by means of the socket $a'$ of the cylinder C', which fits the ball $b'$ of the shaft, which has six sides, $c$; otherwise it is like the ball $b$. The cylinder C' has an annular lip, $d$, which holds it in connection with the ball $b'$. The inner end of the coupling C fits the socket $a'$, and is confined therein by means of the pin $e$, which passes through the cylinder C'.

D is a coupling-ring, which is screwed upon the periphery of the socket $a$, as seen in Fig. 2, for holding the ball $b$ in connection therewith, the ring having an annular lip, $f$, for that purpose, as shown in Fig. 2.

I claim as my invention—

In a ball-and-socket coupling for shafts or tubes, a ball having four or more equal sides, which are flat in the circumferential direction of the coupling, and concentric with the ball in the longitudinal direction thereof, in combination with a corresponding socket, whereby the shafts or other devices are held firmly together circumferentially, and are adapted to be moved longitudinally out of line with each other, substantially in the manner shown and described.

H. A. KIMBALL.

Witnesses:
 L. B. STEELMAN,
 STEPHEN USTICK.